US009634962B2

(12) United States Patent
Harran et al.

(10) Patent No.: US 9,634,962 B2
(45) Date of Patent: Apr. 25, 2017

(54) PRE-STAGING MESSAGES AT A REMOTE LOCATION

(71) Applicant: International Business Machines Corporation, Armonk, NY (US)

(72) Inventors: Richard M. W. Harran, Southampton (GB); Matthew W. Leming, Romsey (GB); Peter Siddall, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 14/685,993

(22) Filed: Apr. 14, 2015

(65) Prior Publication Data

US 2016/0308792 A1 Oct. 20, 2016

(51) Int. Cl.
```
G06F 15/16      (2006.01)
H04L 12/861     (2013.01)
H04L 29/08      (2006.01)
H04L 29/14      (2006.01)
```

(52) U.S. Cl.
CPC ...... *H04L 49/9005* (2013.01); *H04L 67/1097* (2013.01); *H04L 67/2842* (2013.01); *H04L 69/40* (2013.01)

(58) Field of Classification Search
USPC .................................. 709/217, 238
See application file for complete search history.

(56) References Cited

U.S. PATENT DOCUMENTS

| | | | |
|---|---|---|---|
| 5,999,964 A * | 12/1999 | Murakata | G06F 9/546 709/201 |
| 7,035,852 B2 | 4/2006 | Hopewell et al. | |
| 8,261,286 B1 * | 9/2012 | Fateev | G06F 9/546 709/203 |
| 8,631,418 B2 | 1/2014 | Hickson et al. | |
| 2008/0294661 A1 | 11/2008 | Garza et al. | |
| 2014/0006541 A1 | 1/2014 | Bittles et al. | |

FOREIGN PATENT DOCUMENTS

JP     2012155740 A     8/2012

OTHER PUBLICATIONS

Wickramarachchi et al., "Andes: a highly scalable persistent messaging system". 2012 IEEE 19th International Conference on Web Services; pp. 504-511; WSO2 Inc., Mountain View, CA.

* cited by examiner

*Primary Examiner* — Philip B Tran
(74) *Attorney, Agent, or Firm* — Walter L. Rudberg

(57) ABSTRACT

A method for message handling between a message producer and a remote message consumer in a shared queue computing environment. The method includes, receiving from a message producer, at least one message by a first queue manager. A first queue manager writes both the message data associated with at least one message, to a shared data repository, and a pointer, associated with the message data to a coupling facility, using an uncommitted key. The second queue manager, upon an indication that an uncommitted key is written to the coupling facility, reads the message from the shared data repository based on the pointer, and stores the message in an internal memory storage buffer. The first queue manager then commits a batch of messages. Finally, the second queue manager merges the pointer and the message from the internal memory storage buffer, in response to a remote message consumer requesting the message.

20 Claims, 9 Drawing Sheets

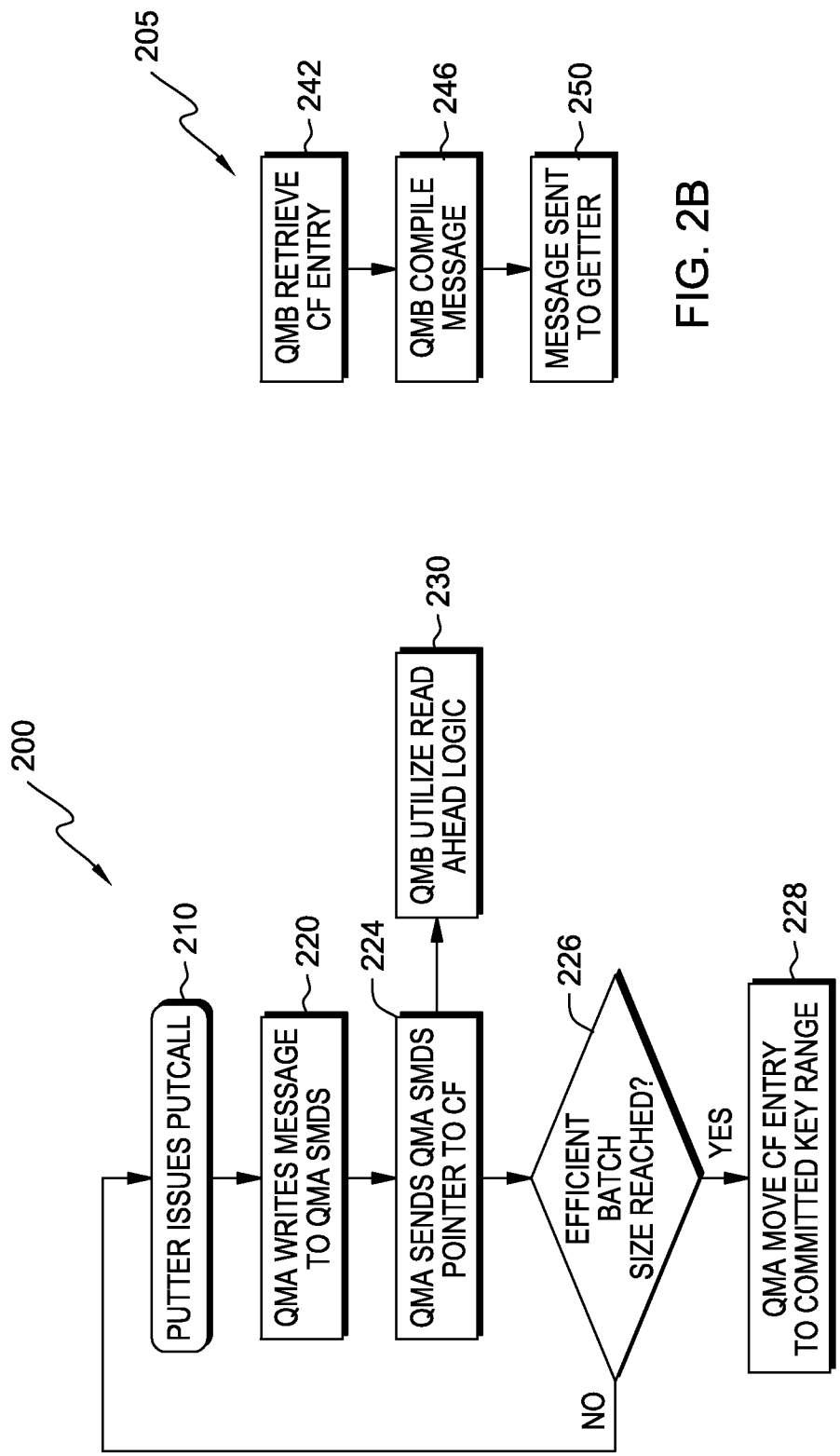

PRE-STAGING MESSAGES AT A REMOTE LOCATION

BACKGROUND OF THE INVENTION

The present invention relates generally to data processing systems, and more particularly to the use of pre-staging messages at a remote location within computer programs and data processing systems.

Within data processing systems, transferring messages between programs using a message queue environment is very common in computing and business practices. Generally, a program initiates the message transfer by putting a message of instructions in a queue to be transferred to a second program. The second program gets the message from the queue and acts on the message per the first program's instructions.

A common use of a message queue environment is in data replication. In efforts to eliminate or reduce the risk of business interruptions, an increasing number of companies worldwide are implementing remote data-minoring solutions over extended distances, allowing continuous availability, as well as data backup for disaster recovery. One known solution, the Geographically Dispersed Parallel Sysplex® (GDPS) architecture, available from International Business Machines of Armonk, N.Y., is capable of providing zero data loss and industry-leading disaster recovery response times.

Typically, a message is a string of bytes which are meaningful to the applications that use the message. Messages are used to transfer information from one application program to another (or between different parts of the same application). A queue is a data structure used to store messages and is operated by a queue manager. The queue manager is responsible for maintaining the queues and for storing all the messages it receives onto the appropriate queues.

SUMMARY

According to one embodiment of the present invention, a method for message transfer is provided, the method comprising: receiving, from a message producer, at least one message to a queue administered by a first queue manager; writing, by the first queue manager, message data associated with the at least one message, to a repository; writing, by the first queue manager, a pointer associated with the message data to a coupling facility, with an uncommitted key, wherein the pointer indicates a location of the message data on the repository; establishing, by a second queue manager, at least one monitor of the coupling facility, wherein the at least one monitor of the coupling facility identifies an uncommitted key written to the coupling facility; responsive to receiving an indication that an uncommitted key is written to the coupling facility, from the at least one monitor, reading, by the second queue manager, the message from the repository based on the pointer, and storing said message in a storage buffer associated with the second queue manager; committing, by the first queue manager, a batch of one or more messages wherein committing the batch of one or more messages comprises moving said pointer to a committed key within said coupling facility; and merging by the second queue manager, the pointer and the message data from the storage buffer associated with the second queue manager, in response to a message consumer requesting the message.

Another embodiment of the present invention provides a computer program product for message transfer, based on the method described above.

Another embodiment of the present invention provides a computer system for message transfer, based on the method described above.

BRIEF DESCRIPTION OF THE DRAWINGS

FIG. 2A is a flowchart illustrating operational steps for pre-staging messages in accordance with an embodiment of the present invention;

FIG. 2B is a flowchart illustrating operational steps of a request by a getter and subsequent retrieval of a message, in accordance with an embodiment of the present invention.

DETAILED DESCRIPTION

Figure 1:
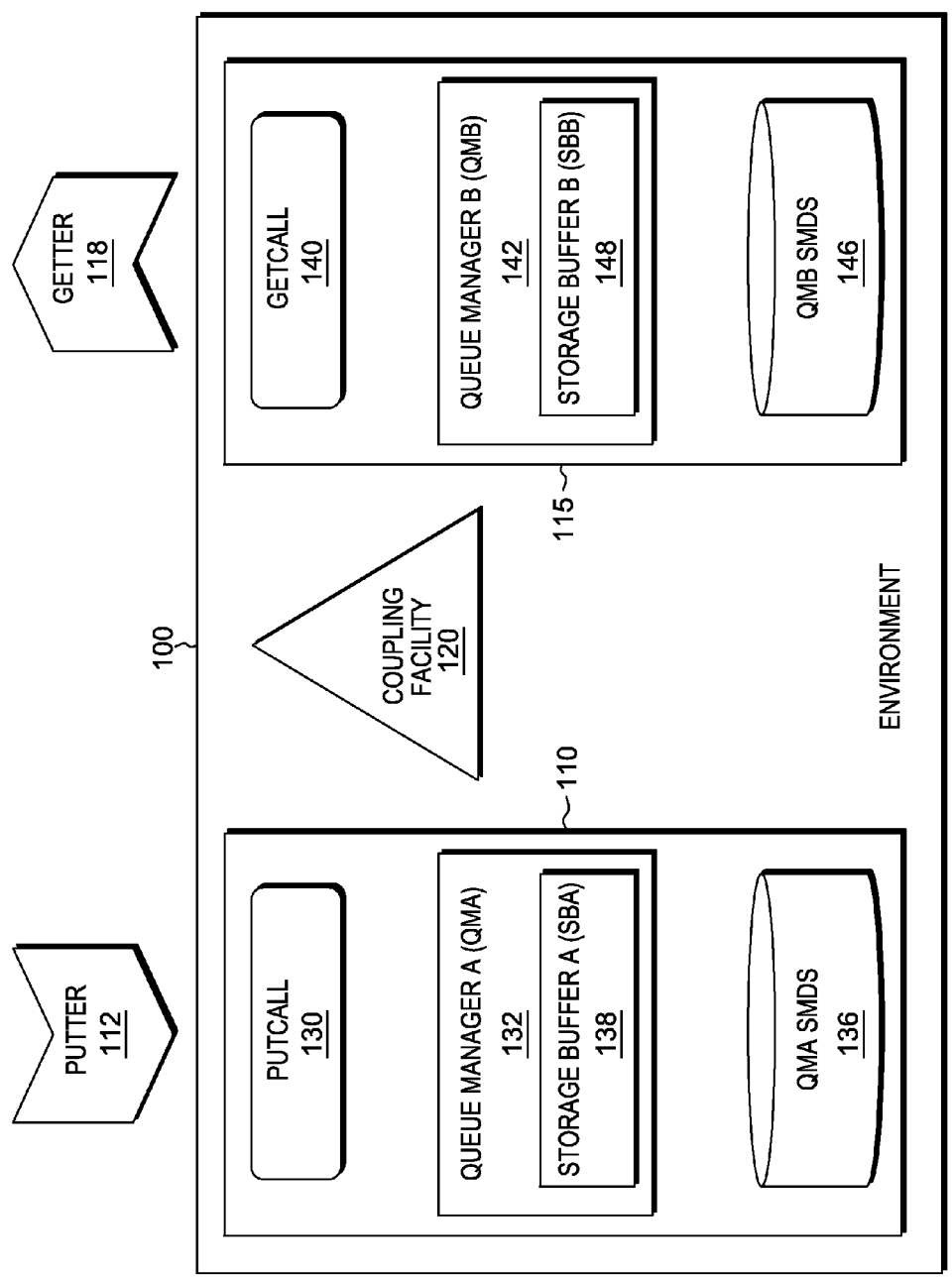
FIG. 1 is a functional block diagram illustrating a shared queue environment, in accordance with an embodiment of the present invention.

The embodiments of the present invention will be described in the context of data processing and communication networks in which a plurality of programs have access to certain data processing system resources. Programs running on different computers within a network are able to exchange data and hence interoperate using messages and queues. A message queue environment enables programs to communicate with each other across a network of unlike components such as processors, subsystems, operating systems, and communication protocols.

Messaging and queueing enables programs to send messages to an input queue of any other target program and each target program can take these messages from its input queue for processing. Generally, a sender program, known as a Message Producer, hereinafter referred to as putter, puts a message into a queue. Then the receiving program, known as a Message Consumer, hereinafter referred to as getter, gets the message from the queue and executes the instructions the message contains. Putter and getter can be any program that communicates via a messaging system.

A common use of a message queue environment is in data replication. Typically, changes to a first database are intercepted, a message representation of the change(s) is placed into a queue, and the message representation is transferred, then written to a second remote database, thereby creating a mirrored copy of the first database. This process minimizes business interruptions by allowing for a quick recovery of computer data in the case of a disaster.

In the above example, the interception of changes to the first database, then creating a message representing the changes, is referred to as the Capture Process. The Capture Process puts the message representing the changes to the first database into the message queueing environment, to be transferred to a targeted program. The Remote Apply Process acquires the transferred message and writes the changes to the second, remote database for data replication.

GDPS® architecture, available from International Business Machines of Armonk, N.Y., makes use of the messages and queues. GDPS® systems are often geographically dispersed, creating an impact on transaction response times, slowing down a data replication process. For example, when a message is received by a queue, it is subject to a delay due to the processing of the message, as well as the retrieval and subsequent forwarding of the message over significant distances. Eventually, as distances increase significantly, the message transfer does not occur during the same interval of time as other similar processes at a local level; thereby causing a delay in the system as it must wait for the message to arrive. Embodiments of the present invention provide systems and methods for minimizing such delays. Embodiments provide means for minimizing subsequent delays due to disk latency by using a shared queue environment to pre-stage message data into buffers.

The present invention may be implemented in many different data processing systems and network configurations. Nevertheless, the present invention is particularly applicable to a shared queue environment wherein one or more queue manager programs running on different data processing systems have shared access to one or more queues in a shared resource. Each system has at least one processor and an operating system. Further, each system can constitute either a separate physical machine or a logical partition of a logically partitioned machine. The shared resource may be, for example, a coupling facility. The coupling facility's system may be a separate physical machine or a logical partition of a machine.

The present invention will now be described in detail with reference to the Figures. FIG. 1 is a functional block diagram illustrating a shared queue environment, generally designated 100, in accordance with one embodiment of the present invention. FIG. 1 provides only an illustration of one implementation, and does not imply any limitations with regard to the environments in which different embodiments may be implemented. Modifications to shared queue environment 100 may be made by those skilled in the art without departing from the scope of the invention as recited by the claims. In the exemplary embodiment, shared queue environment 100 includes capture side 110, apply side 115, and coupling facility 120 all in communication, for example, via a network connection.

Capture side 110 and apply side 115 address the process of message transfer from one source to another. Generally capture side 110 transmits the message and apply side 115 receives the message. Throughout the exemplary embodiment, capture side 110 and apply side 115 control the transfer of information, through messages, between putter 112 and getter 118, respectively.

Capture side 110 includes Queue Manager A (QMA) 132, storage buffer A (SBA) 138, PutCall 130, and capture side shared message data set (QMA SMDS) 136. Apply side 115 includes Queue Manager B (QMB) 142, storage buffer B (SBB) 148, GetCall 140, and apply side shared message data set (QMB SMDS) 146. In this exemplary embodiment, capture side 110 transmits messages and apply side 115 receives the messages. In other embodiments, capture side 110 and apply side 115 may be interchangeable, and messages may be sent and received by both capture side 110 and apply side 115.

QMA 132 and QMB 142 are components of the exemplary message queueing system that provide queueing services to applications and programs. In this exemplary embodiment, QMA 132 interacts exclusively with capture side 110, whereas QMB 142 interacts exclusively with apply side 115.

QMA SMDS 136 is a shared resource between QMA 132 and QMB 142. In a reversed data flow, QMB SMDS 146 is a shared resource between QMA 132 and QMB 142. QMA 132 and QMB 142 both act as a shared data repository allowing message data to be stored within. QMA SMDS 136 and QMB SMDS 146 can be used to offload the message payload from the coupling facility 120 to the shared disks in order to increase system capacity.

SBA 138 and SBB 148 are storage buffers for QMA 132 and QMB 142, respectively. A storage buffer is a region of physical memory storage medium used to temporarily store message data while it is being moved from one place to another.

Putter 112 and getter 118 use calls to communicate with queues and queue managers. In the exemplary embodiment, PutCall 130 and GetCall 140 are calls within shared queue environment 100 from outside applications or programs, (i.e., putter 112 and getter 118, respectively) communicating via messages. When putter 112 puts a message in shared queue environment 100, putter 112 issues PutCall 130 informing QMA 132 to expect an incoming message. When getter 118 retrieves a message from shared queue environment 100, getter 118 issues GetCall 140 informing QMB 142 to transmit a message from within its queue. GetCall 140 returns at most one message per call.

Putter 112 commences the message transfer by putting a message in shared queue environment 100 to be transferred to getter 118. Getter 118 gets the message that putter 112 put in shared queue environment 100, and executes the instructions the message contains. In the exemplary embodiment, putter 112 transfers to capture side 110 a message to be transferred to a specific program. Getter 118 communicates with apply side 115, as it retrieves a message from shared queue environment 100, to accomplish the task putter 112 requested of it. Putter 112 and getter 118 can be any program that communicates via a messaging system.

Coupling facility 120 provides a link between capture side 110 and apply side 115, and is a shared resource between QMA 132 and QMB 142. Coupling facility 120 is a logical partition which provides high speed caching, allows multiple processors to access the same data, and is capable of providing high-speed data sharing with data integrity across multiple platforms allowing for high performance read/write sharing of data by various applications. Coupling facility 120 is capable of key-range monitoring, wherein it allows outside queue managers to monitor the input of committed and uncommitted key-ranges into coupling facility 120.

In this exemplary embodiment, shared queue environment 100 includes two queue managers: one responsible for putting a message into the system (i.e., QMA 132) from a message producer (i.e., putter 112), and the other responsible for getting a message from the system (i.e., QMB 142) to a message consumer (i.e., getter 118). In other embodiments of present invention, shared queue environment 100 may contain multiple queue mangers responsible for putting messages into the system and multiple queue mangers responsible for getting messages from the system. However, the optimum benefit of the invention results if there is a single queue manager responsible for putting a message into the system (i.e., QMA 132), and a single queue manager responsible for getting a message from the system (i.e., QMB 142), as depicted in FIG. 1. There are still benefits resulting from this invention if there are multiple queue managers responsible for putting message(s) into the system, as it allows multiple sources to simultaneously send messages to coupling facility 120, and holding the messages in a queue until the apply side 115 is able to retrieve the messages. However, if there are multiple queue managers responsible for getting message(s) from the system, only a single queue manager can get the message and forward it to the application requesting it; therefore, the other queue managers will expend CPU performance retrieving the message from the shared storage, only to later discard the unused data from their corresponding storage buffers.

The exemplary embodiment preemptively transfers a message from the queue manager associated with Capture side 110 (i.e., QMA 132), to the queue manager associated with apply side 115 (i.e., QMB 142), prior to being requested by getter 118. The message is pre-staged into an apply side 115 buffer (i.e., SBB 148) of the system, therefore once the pointer is retrieved from coupling facility 120 by QMB 142, no subsequent delay due to disk latency is suffered when accessing the message data. If getter 118 requests the message, the message is already locally available providing for a quick transmission of message. If, however, getter 118 does not request a message, then the message will remain in SBB 148 and eventually be overwritten. For example, if message data is put into SBB 148 and not used, it will be evicted as the cache fills up from other processes. The sequence of operations performed in accordance with an implementation of the invention will now be described with reference to FIG. 2.

FIG. 2A depicts flowchart 200, illustrating operational steps for pre-staging messages, in accordance with an embodiment of the present invention.

In step 210, putter 112, issues PutCall 130 to transfer a message to QMA 132. In this exemplary embodiment, putter 112 commences the message transfer sequence to getter 118 by putting a message on Capture side 110. QMA 132 handles the complexities of transferring the message from the sender to the target queue In step 220, QMA 132 writes the message data to QMA SMDS 136, wherein the message data is a stream of bytes representing the instructions of the message along with the header and other miscellaneous information associated with it. In this exemplary embodiment, QMA 132 automatically writes the message data to QMA SMDS 136 in response to receiving a message from putter 112.

In step 224, QMA 132 sends the QMA SMDS 136 disk pointer to coupling facility 120 with an uncommitted key. The disk pointer on coupling facility 120 contains data which identifies the location of the message on QMA SMDS 136. The exemplary embodiment utilizes two different shared resources, coupling facility 120 and QMA SMDS 136, to increase overall performance. Overall performance is increased as QMA SMDS 136 allows a reduction of message data stored in coupling facility 120, thereby reducing system resources.

Step 226 and step 230 may occur simultaneously as capture side 110 and apply side 115 work asynchronously, wherein capture side 110 does not wait for apply side 115 to respond that it has completed its designated task. Therefore, capture side 110 can continue its own processing (i.e., sending messages to apply side 115), without the need to wait for apply side 115 to process the message.

In step 230, QMB 142 uses the read ahead logic. QMB 142 continuously monitors coupling facility 120 for new entries. Specifically, QMB 142 monitors coupling facility 120 for new entries using an uncommitted key, as well as when entries are moved to the committed key-range. The two monitors act as feedback loops, wherein they continually inspect coupling facility 120 for specific actions and then notify QMB 142 when said actions are acknowledged. The exemplary embodiment utilizes these monitors as a 'read ahead' logic pattern in order to improve system performance. Once QMA 132 writes the disk pointer onto coupling facility 120 using an uncommitted key (step 224), QMB 142 is alerted and automatically detects the new coupling facility 120 uncommitted key entry using a pre-established monitor.

Upon notification of the new uncommitted key in coupling facility 120, QMB 142 reads the disk pointer from coupling facility 120. The disk pointer on coupling facility 120 contains data which identifies the location of the message on QMA SMDS 136. The disk pointer remains on coupling facility 120 as QMB 142 merely obtains certain data identifying the location of the message. QMB 142, utilizing QMA SMDS 136 disk pointer, optimistically retrieves the message data from QMA SMDS 136. In this exemplary embodiment, the preemptive retrieval of the message by QMB 142 is 'optimistic' as there is no guarantee that putter 112 will not abort the transmission of the message, or that getter 118 will request the retrieved message. QMB 142 stores the retrieved message data in SBB 148. This prefetching of the message increases message transfer speed as the message is pre-transferred and stored locally, thereby minimizing the latency of getter 118 as the message transfers from QMA SMDS 136, which may be located geographically distant from apply side 115.

In step 226, QMA 132 determines whether an efficient batch size is created for the transmitted messages. An efficient batch size is based on overall system parameters.

If, in step 226, QMA 132 determines that the batch size is not quantitatively efficient, then QMA 132 waits until enough messages are received to make the batch size 'efficient' and the operational steps of FIG. 2A described above are repeated until an efficient batch size is reached. For illustrative purposes, step 210 is repeated as QMA 132 receives, then writes, each additional message data on QMA SMDS 136 and sends the QMA SMDS 136 disk pointer to coupling facility 120. QMB 142 is notified, then reads the message data from QMA SMDS 136 per the disk pointer and stores the message data locally on SBB 148.

If, in step 226, QMA 132 determines that an efficient batch size has been reached, then, in step 228, QMA 132 commits the messages in the batch. In other embodiments, putter 112 decides when the batch should be committed. QMA 132 moves all coupling facility 120 entries associated with said batch of messages to the committed key-range, thereby committing the message in the batch.

Steps 210, 220, 224, and 226, can all occur simultaneously with the pre-fetching of messages of step 230. The overlap is advantageous because if there are multiple messages within a unit of messages being transferred, it allows a significant number of the messages to be pre-staged before the unit of work commits. Pre-staging the messages reduces the time required for the getter 118 to get the messages because a large number of the messages are now local, thus no remote disk access is required.

FIG. 2B depicts flowchart 205, illustrating operational steps of a request by getter 118 and subsequent retrieval of a message, in accordance with an embodiment of the present invention.

In step 242, QMB 142 is notified, through one of its pre-established monitors, that a coupling facility 120 entry has been moved to the committed key-range. In this exemplary embodiment QMB 142 continuously monitors coupling facility 120 for entries that are moved to the committed key-range (i.e., FIG. 2A, step 228). Therefore, once QMA 132 commits a batch of entries and moves the entries in coupling facility 120 to the committed key-range, QMB 142 is automatically notified using the pre-established monitor. Then, QMB 142 destructively retrieves the coupling facility 120 entry representing the message. The retrieval is destructive, as the coupling facility 120 entry representing the message is no longer visible on coupling facility 120 to other getters.

In step 246, QMB 142 compiles the message data by finding the message data pre-staged in SBB 148 and merging the pre-staged cached message data with the committed key disk pointer entry from coupling facility 120. In this exemplary embodiment, latencies are reduced (such as disk latency, network latency, processor latency, and the like) when QMB 142 finds the message data pre-staged in SBB 148, as the message data is already locally available, as it was pre-staged on apply side 115. In this exemplary embodiment, since QMB 142 preemptively retrieved the message(s), getter 118 does not have to wait for QMB 142 to recover message data since the message(s) are locally available in SBB 148. However, getter 118 must wait for a disk pointer to be retrieved from coupling facility 120. Since the disk pointer is smaller in size than message data, coupled with the fact that no disk is utilized, it is comparably a quicker transfer.

In step 250, upon getter 118 executing GetCall 140 to apply side 115, QMB 142 gathers the message and forwards the message to getter 118, thereby completing the message transfer. The operational steps of FIG. 2B may be repeated each time putter sends a message to getter 118, and getter 118 retrieves any message within QMB 142, for each GetCall 140 issued.

The exemplary embodiment also utilizes a shared queue environment, wherein, a plurality of queue managers, running on different data processing systems, have access to shared resources, which are the combination of coupling facility 120 and QMA SMDS 136. Further, the present invention may be implemented in a plurality of different data processing systems and network configurations. For example, QMA 132 and QMB 142 can be located on the same computing device or separate computing devices geographically dispersed.

FIGS. 3A-G are state diagrams depicting a message transfer over a period of time, in accordance with an embodiment of the present invention. FIGS. 3A-G describe non-specific increments of time, originating from $T_0$ and concluding at $T_6$, wherein $T_0$ portrays the preferred embodiment prior to an initial message being transferred, and $T_6$ describes getter 118 receiving the message.

Figure 3A:
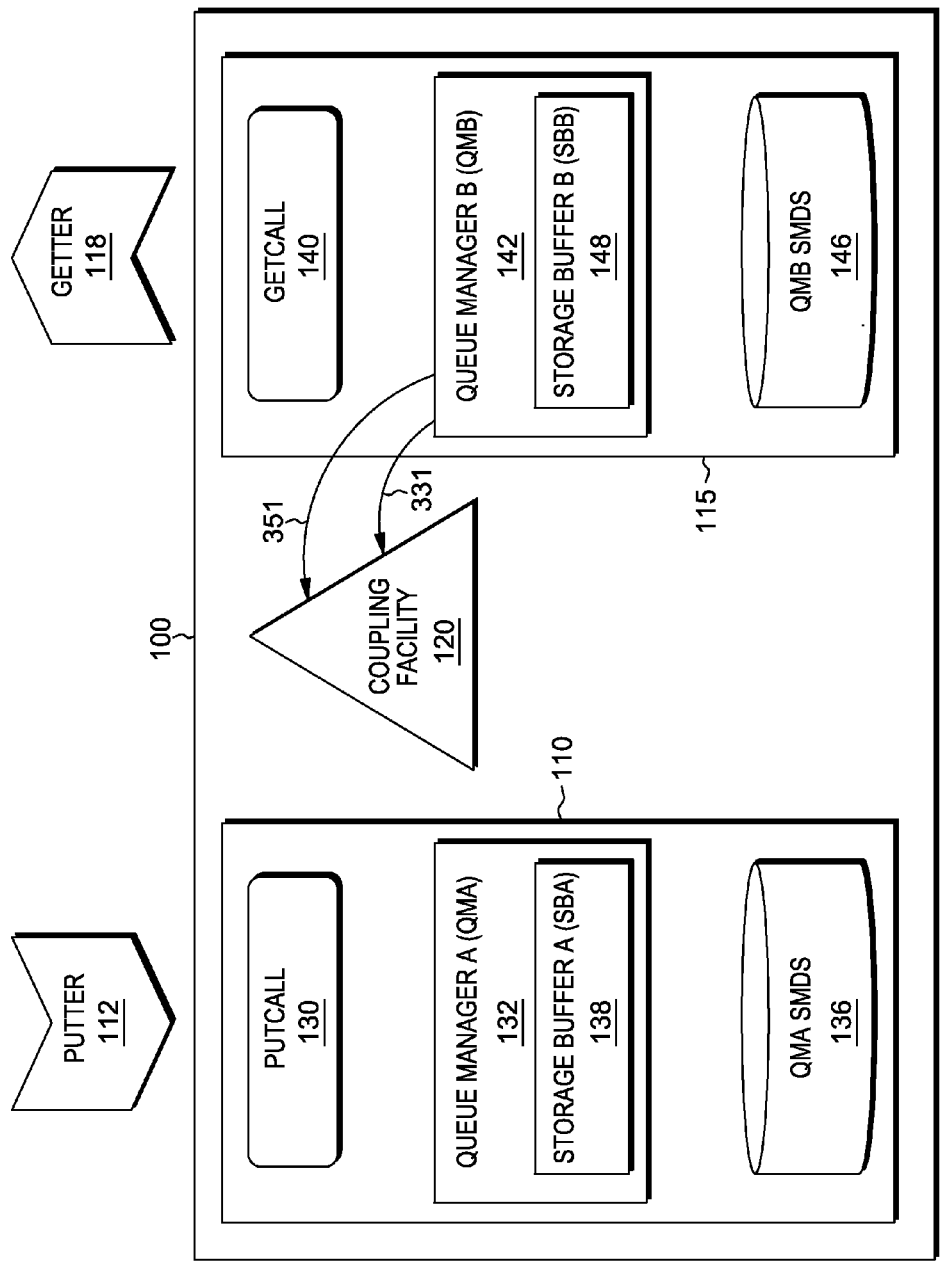
FIGS. 3A-G are state diagrams depicting a message transfer over a period of time, in accordance with an embodiment of the present invention.

FIG. 3A portrays a period of time prior to the commencement of a message being transferred, where time (T) is $T_0$. FIG. 3A depicts the establishment of read ahead logic on apply side 115. Generally, the read ahead logic provides a means wherein QMB 142 acquires messages, locally stored in its buffer, SBB 148, prior to getter 118 requesting said messages.

In the exemplary embodiment, prior to putter 112 putting a message in the queue to be transferred, a monitoring system is established. The monitoring system acts as a feedback loop, wherein QMB 142 continually observes coupling facility 120 for specific activities. In FIG. 3A, QMB 142 establishes monitor 331, wherein QMB 142 continually observes coupling facility 120 for new entries using an uncommitted key. QMB 142 also establishes monitor 351 to continually inspect coupling facility 120 for when entries are moved to the committed key-range. Upon either action taking place within coupling facility 120, the monitoring system notifies QMB 142, allowing QMB 142 to take specific actions to transfer the message in an expeditious manner.

Figure 3B:
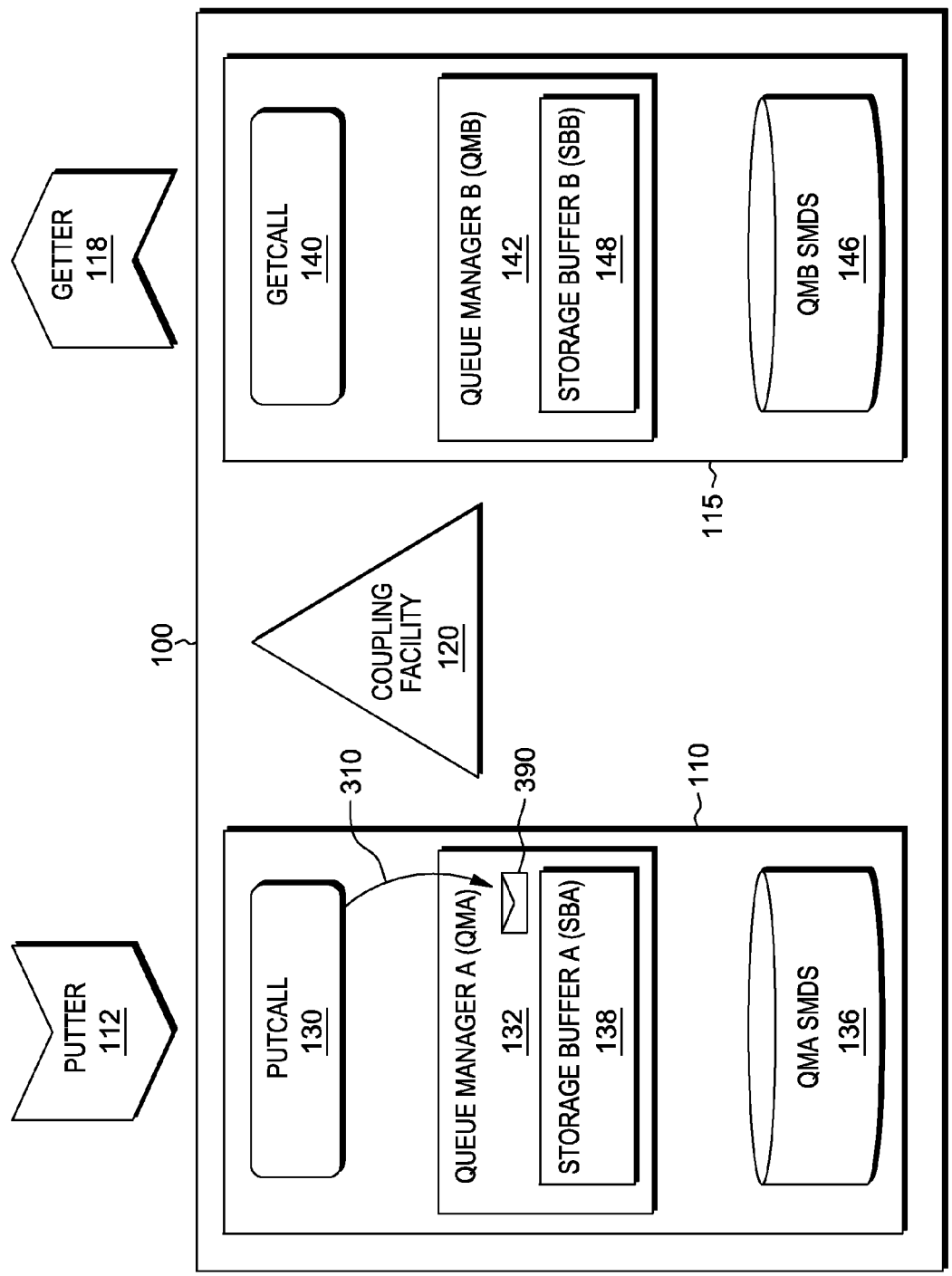

FIG. 3B depicts the commencement of a message being transferred. With reference to FIG. 3B, the message transfer process initiates when time is $T_1$. At $T_1$ putter 112 issues the PutCall 130 call to transfer a message to QMA 132. FIG. 3B represents the message transfer 310, when PutCall 130 call moves message 390 to QMA 132.

Figure 3C:
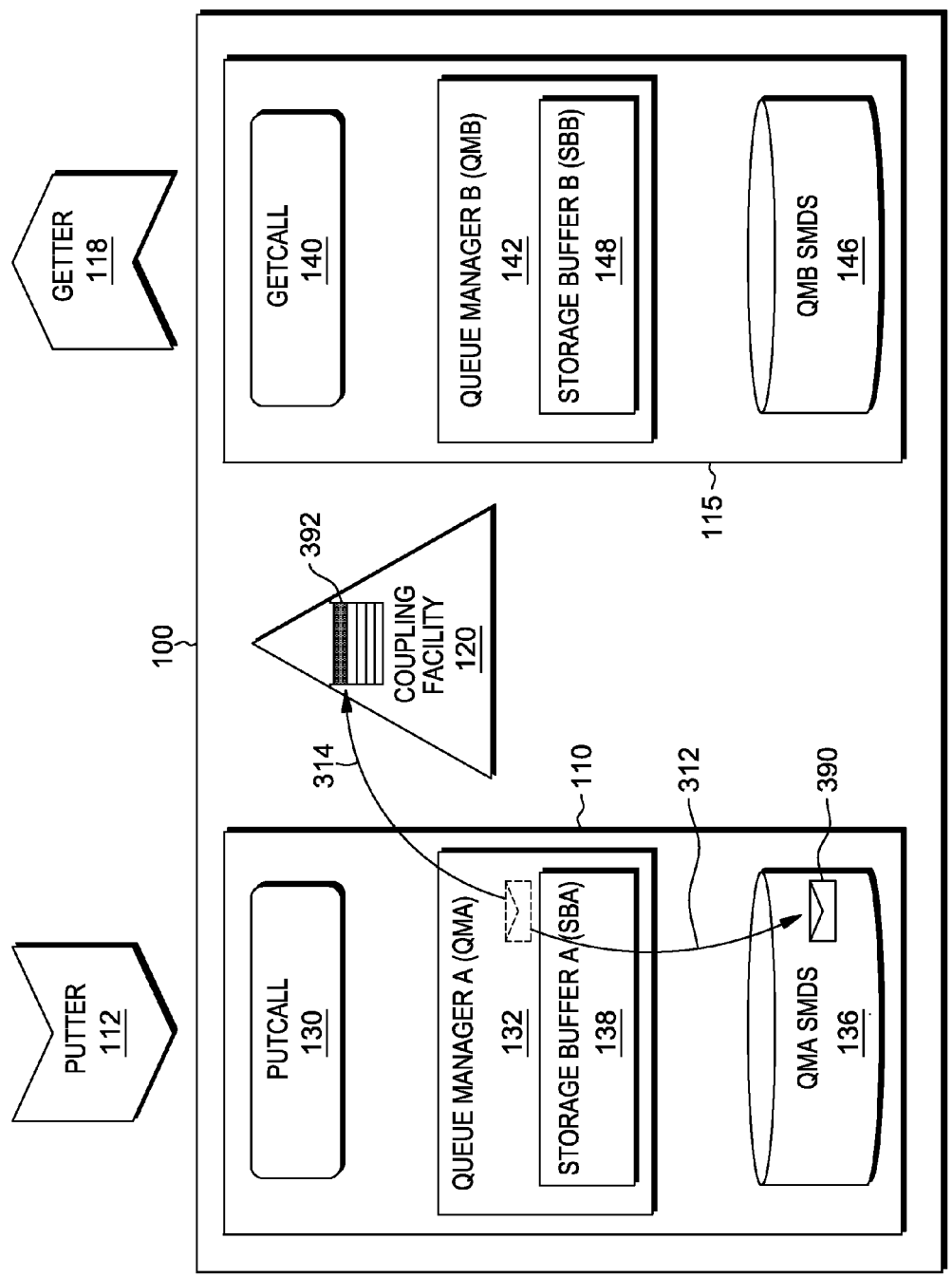

FIG. 3C represents time at $T_2$. With reference now made to FIG. 3C, two shared resources (i.e., coupling facility 120 and QMA SMDS 136) are used, allowing apply side 115 to pre-fetch a message. Once QMA 132 acquires message 390, process 312 writes the message 390 to QMA SMDS 136. Next, QMA 132 process 314 writes QMA SMDS disk pointer 392 into coupling facility 120 with an uncommitted key.

Figure 3D:
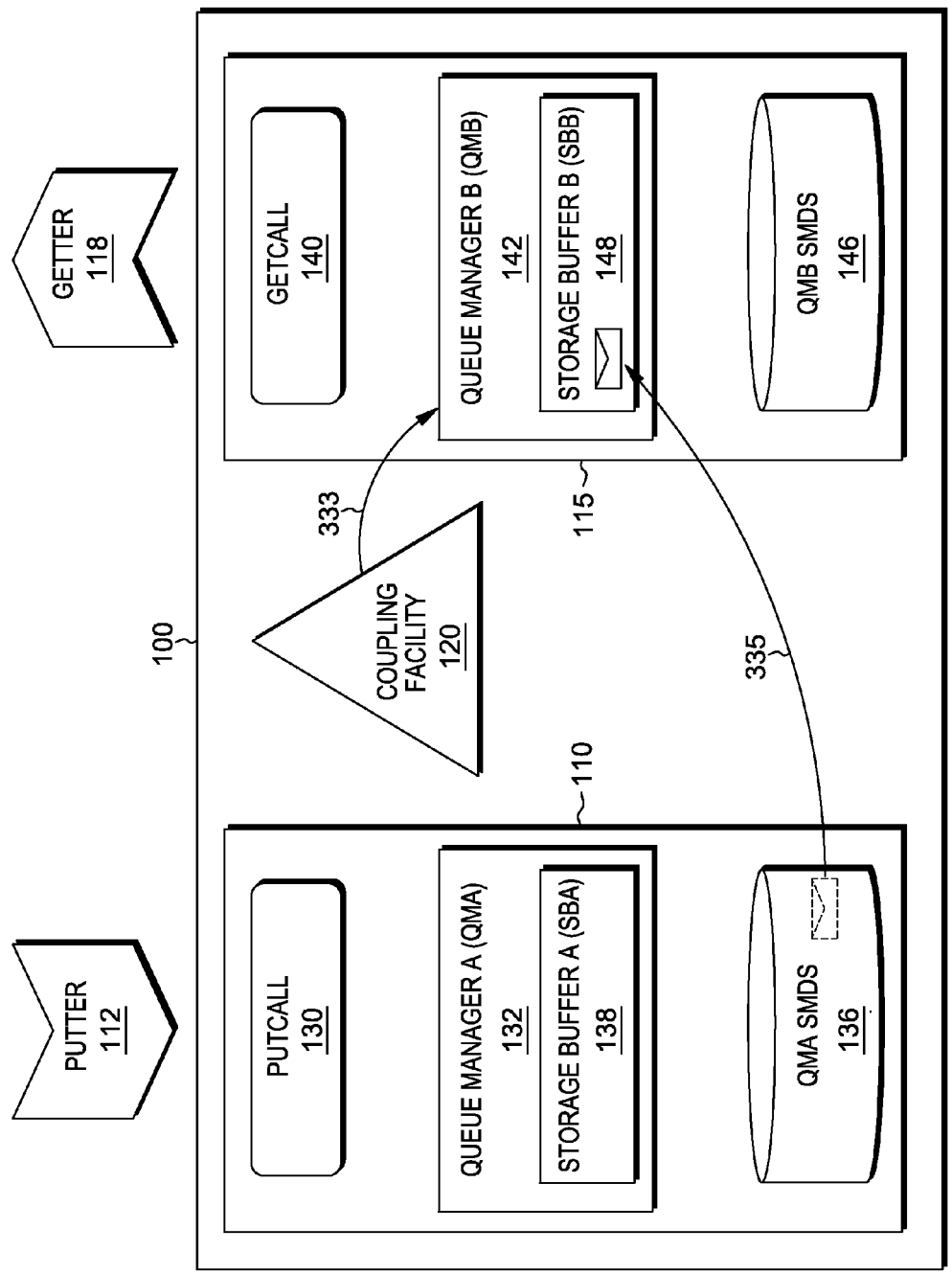

FIG. 3D depicts time at $T_3$, wherein apply side 115 exploits the read ahead logic established at $T_0$ (i.e., FIG. 3A). Monitor 331 allows QMB 142 to continually monitor coupling facility 120 for new uncommitted key entries. QMB 142 receives notification 333 when a new uncommitted key entry in coupling facility 120 is created (i.e., FIG. 3C). Notification 333 includes a reference to QMA SMDS disk pointer 392, which is the location of the message data in QMA SMDS 136. Upon receiving notification 333, QMB 142, through process 335, reads message 390 from QMA SMDS 136 and stores data associated with message 390 into SBB 148. In the exemplary embodiment, process 335 strives to minimize delays as it optimistically moves the message data allowing it to be locally stored on apply side 115. Therefore, when getter 118 requests the message, it is already locally stored allowing for a quicker transfer, rather than having to transfer the message from a remote location. Process 335 copies the data of message 390 and stores it locally at apply side 115, regardless of whether getter 118 retrieves the message, or putter 112 aborts the message transfer transaction.

Figure 3E:
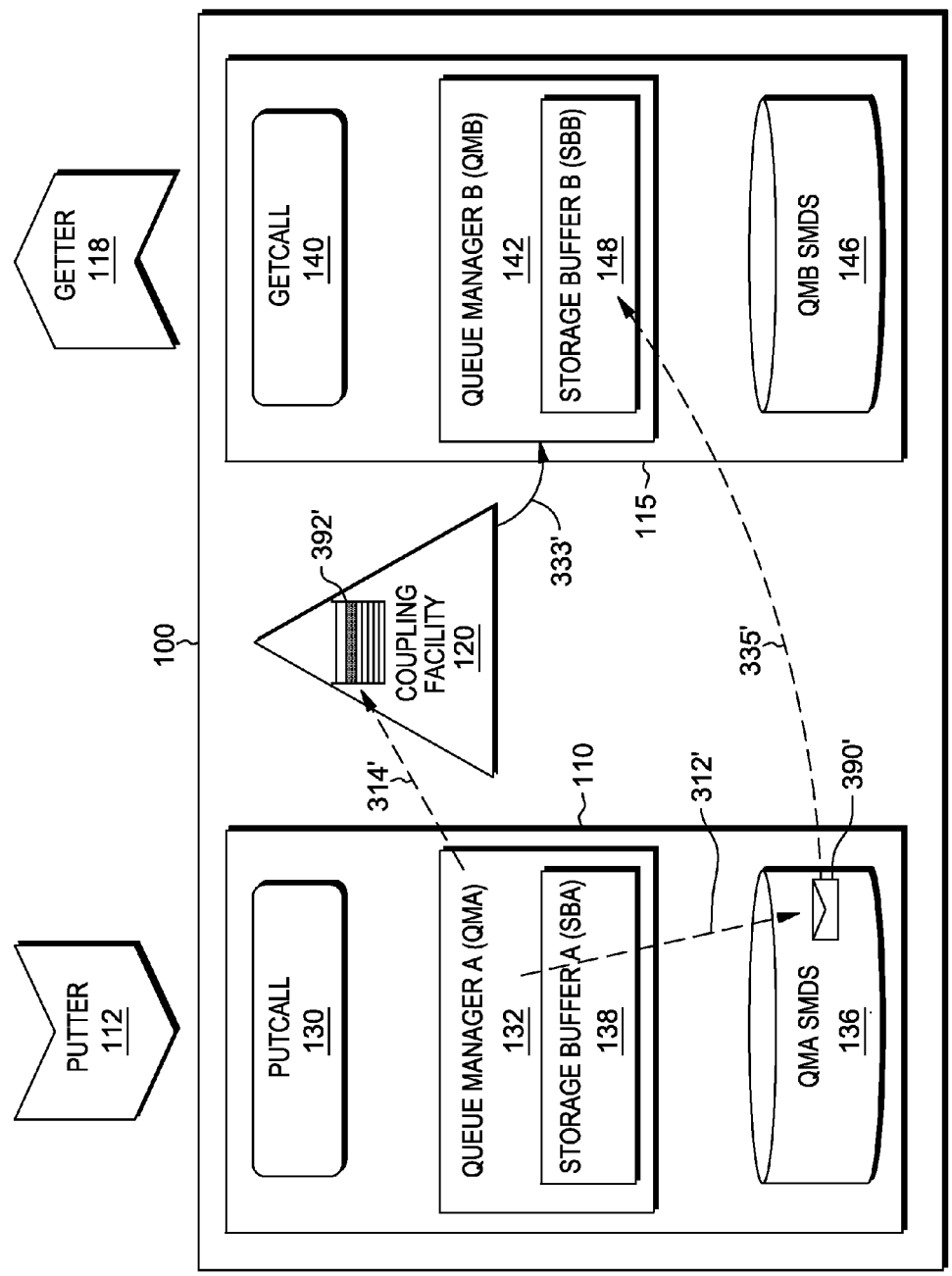

FIG. 3E depicts time at $T_4$ wherein QMA 132 achieves an efficient message batch size. In message processing, a batch of messages is the set of messages, put and/or gotten in the same transaction. When a message is put inside a singular transaction scope, it is added to the batch. That entire batch of messages is undetectable to getter 118, until the batch is committed.

An efficient size of each batch is dependent on the overall system parameters. Specifically an efficient batch size is one where application concerns for latency of messaging are compared against system concerns. For instance, a batch can be committed comprising one (1) singular message or 100 messages. The receiving queue manager will receive the committed batch, the batch containing either a singular message or 100 messages.

Depending on system parameters, sending one message at a time can be ideal or can be excessive, leading to a drain on system resources. For example, if a system is constantly communicating, typically sending thousands of messages over a short period of time, committing each message to its own batch and sending it individually is a drain on system resources; while committing hundreds of messages to a single batch improves system performance. However if a system only sporadically sends a message over a large period of time, committing each message to batch and sending it individually is ideal; otherwise, the queue manager must wait for a threshold quantity of messages prior to committing the batch, thereby causing a potentially significant delay while waiting for enough messages to commit the batch.

The message transfers of FIG. 3B, FIG. 3C and FIG. 3D are repeated until an efficient batch size is reached. For example, in FIG. 3E, the steps are repeated until an efficient batch size is reached. In process 312', QMA 132 writes message 390' to QMA SMDS 136. In step 314' QMA 132 writes QMA SMDS Disk Pointer 392' into coupling facility 120 with an uncommitted key. QMB 142 is notified that a new coupling facility 120 entry is created using an uncommitted key, 333', through the earlier established monitor 331 (FIG. 3A). In process 335', QMB 142 retrieves message 390' into SBB 148 based on QMA SMDS Disk Pointer 392' information. This process repeats until an efficient batch size is reached.

Figure 3F:
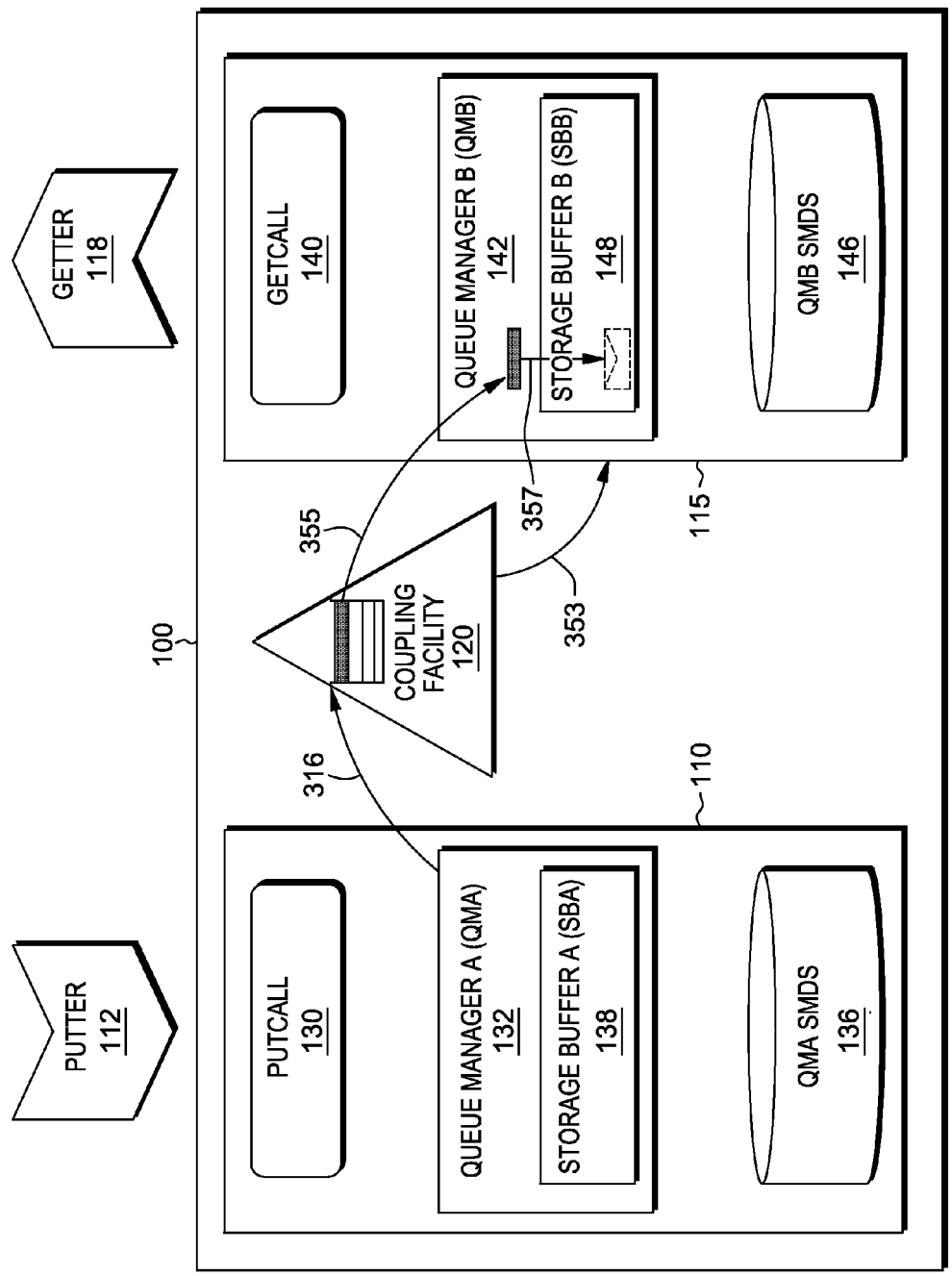

FIG. 3F depicts time at $T_5$, wherein the message transfer to apply side 115 is accomplished. Once an efficient batch size is reached, QMA 132 commits the batch 316, thereby moving coupling facility 120 entries into a committed key-range. Monitor 351, established at $T_0$ (FIG. 3A), allows QMB 142 to continually monitor coupling facility 120 for when entries are moved to the committed range. Notification 353 alerts QMB 142 when the messages in coupling facility 120 are moved to the committed range. Notification 353 also informs QMB 142 that committed messages are available. Notification 353 is a small bit of information, allowing it to travel quickly across the network. QMB 142 does not act on notification 353 until getter 118 issues GetCall 140. Once a GetCall 140 is issued, in process 355, QMB 142 destructively retrieves QMA SMDS disk pointer 392, representing the message. In process 355, QMB 142 removes QMA SMDS disk pointer 392 from coupling facility 120. In process 357, QMB 142 reads the information contained within QMA SMDS disk pointer 392 and merges it with the message(s) stored in SBB 148. The data in coupling facility 120 is only deleted based on the indication that getter 118 wants a message.

Figure 3G:
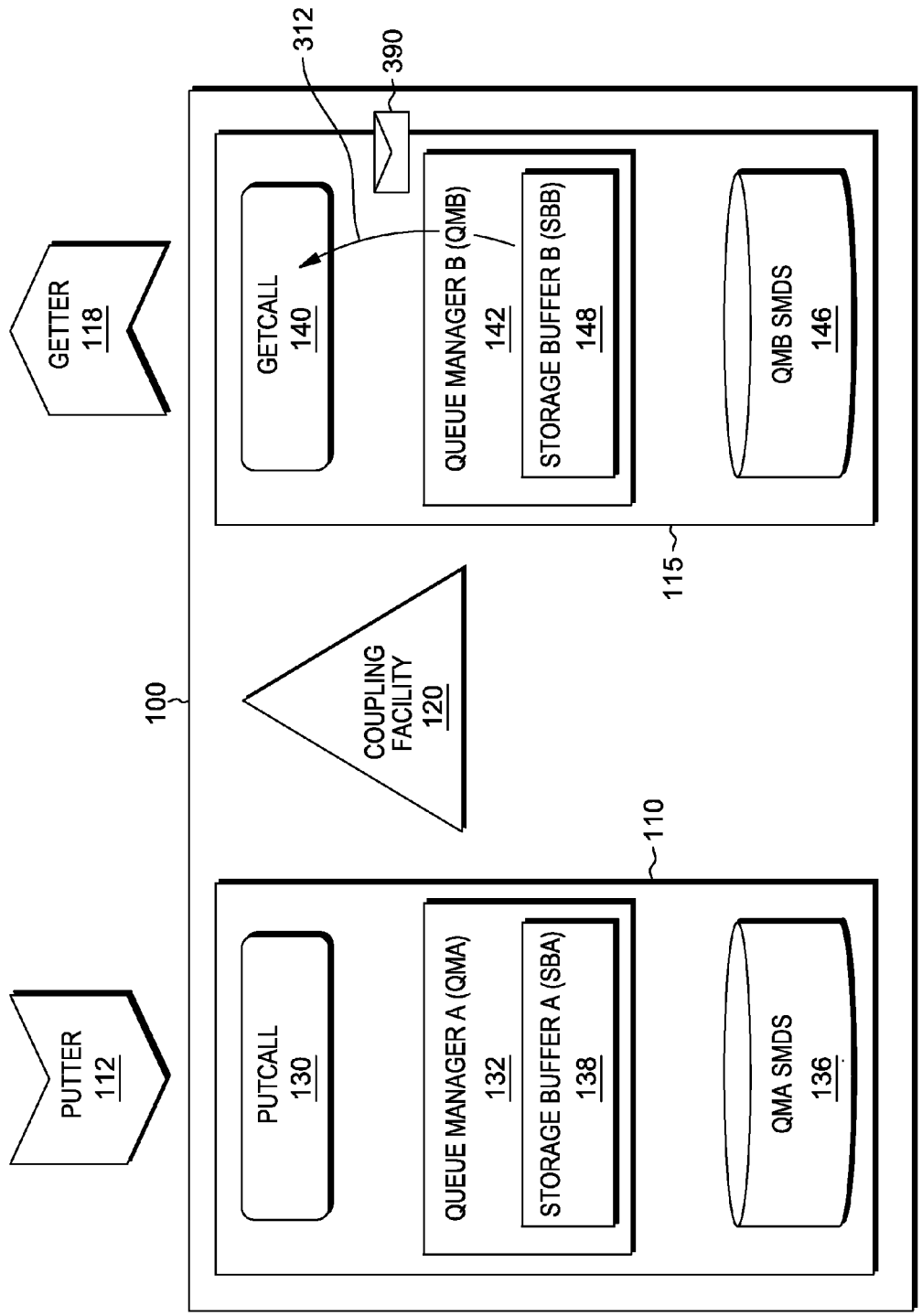

FIG. 3G depicts time at $T_6$ when message 390 is delivered to getter 118, which issued the GetCall 140. QMB 142 transfers message 390 through process 312 to getter 118 thereby completing the message transfer.

The processes described in FIG. 3F and FIG. 3G are iterated each time getter 118 issues GetCall 140. For example, each time getter 118 issues GetCall 140 coupled with QMA SMDS 136 committing messages to a batch, QMB 142 destructively gets the first disk pointer (to QMA SMDS 136) from coupling facility 120. QMB 142 then acquires from SBB 148 a cached version of the message data. QMA SMDS disk pointer 392 and the cached message data is merged.

In the exemplary embodiment SBB 148 is a cache. Since SBB 148 is cache, there is no need for extra logic to address the situation if QMA 132 aborts its message transfer. Additionally, if messages stored in SBB 148 are not transmitted, the data will be evicted as the cache starts to fill up.

Once getter 118 receives the message, getter 118 performs the task the message instructed it to do. Under an exemplary embodiment of data replication, the remote apply process gets the message from apply side 115, and then writes the message to a remote copy of a database, completing the data replication process. Through these processes all database changes are recorded providing zero data loss and quick recovery response times in case of a disaster, which caused data loss.

The exemplary embodiment depicts a message transfer from putter 112 to getter 118. In the portrayed directional flow of message information, SBA 138 and QMB SMDS 146 are not utilized. However, in a reverse flow, SBA 138 and QMB SMDS 146 will be used. For explanatory reasons, all devices are shown.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for message transfer, the method comprising:
   receiving, from a message producer, at least one message to a queue administered by a first queue manager;
   writing, by the first queue manager, message data associated with the at least one message, to a repository;
   writing, by the first queue manager, a pointer associated with the message data to a coupling facility, with an uncommitted key, wherein the pointer indicates a location of the message data on the repository;
   establishing, by a second queue manager, at least one monitor of the coupling facility, wherein the at least one monitor of the coupling facility identifies an uncommitted key written to the coupling facility;
   responsive to receiving an indication that an uncommitted key is written to the coupling facility, from the at least one monitor, reading, by the second queue manager, the message data from the repository based on the pointer, and storing said message data in a storage buffer associated with the second queue manager;
   committing, by the first queue manager, a batch of one or more messages wherein committing the batch of one or more messages comprises moving said pointer to a committed key within the coupling facility; and
   merging by the second queue manager, the pointer and the message data from the storage buffer associated with the second queue manager, in response to a message consumer requesting the message.

2. The method of claim 1, wherein the at least one monitor is configured to identify when a committed key is written to the coupling facility.

3. The method of claim 1, wherein the message producer and the message consumer operate in a shared queue environment.

4. The method of claim 1, wherein the repository and the coupling facility are in communication with both the first queue manager and the second queue manger.

5. The method of claim 1, further comprising:
   removing the pointer from the committed key within the coupling facility responsive to a request from the message consumer.

6. The method of claim 1, wherein the storing of said message data in a storage buffer occurs prior to the message consumer requesting the message data.

7. The method of claim 1, wherein the first queue manager and the second queue manager are configured to operate asynchronously.

8. A computer program product comprising:
   a computer readable storage medium and program instructions stored on the computer readable storage medium, the program instructions comprising:
      program instructions to receive from a message producer, at least one message to a queue administered by a first queue manager;
      program instructions to write, by the first queue manager, message data associated with the at least one message, to a repository;
      program instructions to write, by the first queue manager, a pointer associated with the message data to a coupling facility, with an uncommitted key, wherein the pointer indicates a location of the message data on the repository;
      program instructions to establish, by a second queue manager, at least one monitor of the coupling facility, wherein the at least one monitor identifies an uncommitted key written to the coupling facility;

program instructions to, responsive to receiving an indication that an uncommitted key is written to the coupling facility, from the at least one monitor, read, by the second queue manager, the message data from the repository based on the pointer, and store said message data in a storage buffer associated with the second queue manager;

program instructions to commit, by the first queue manager, a batch of one or more messages wherein committing the batch of one or more messages comprises moving said pointer to a committed key within the coupling facility; and program instructions to merge by the second queue manager, the pointer and the message data from the storage buffer associated with the second queue manager, in response to a message consumer requesting the message.

9. The computer program product of claim 8, wherein the least one monitor is configured to identify when a committed key is written to the coupling facility.

10. The computer program product of claim 8, wherein the message producer and the message consumer operate in a shared queue environment.

11. The computer program product of claim 8, wherein the repository and the coupling facility are in communication with both the first queue manager and the second queue manger.

12. The computer program product of claim 8, further comprising:

program instructions to remove the pointer from the committed key within the coupling facility, responsive to a request from the message consumer.

13. The computer program product of claim 8, wherein the program instructions to store said message data in a storage buffer occur prior to the message consumer requesting the message data.

14. The computer program product of claim 8, wherein the first queue manager and the second queue manager are configured to operate asynchronously.

15. A computer system comprising:
one or more computer processors;
one or more computer readable storage media;
program instructions stored on the one or more computer readable storage media for execution by at least one of the one or more processors, the program instructions comprising:

program instructions to receive, from a message producer, at least one message to a queue administered by a first queue manager;

program instructions to write, by the first queue manager, message data associated with the at least one message, to a repository;

program instructions to write, by the first queue manager, a pointer associated with the message data to a coupling facility, with an uncommitted key, wherein the pointer indicates a location of the message data on the repository;

program instructions to establish, by a second queue manager, at least one monitor of the coupling facility, wherein the at least one monitor identifies an uncommitted key written to the coupling facility;

program instructions to, responsive to receiving an indication that an uncommitted key is written to the coupling facility, from the at least one monitor, read, by the second queue manager, the message data from the repository based on the pointer, and store said message data in a storage buffer associated with the second queue manager;

program instructions to commit, by the first queue manager, a batch of one or more messages wherein committing the batch of one or more messages comprises moving said pointer to a committed key within the coupling facility; and program instructions to merge by the second queue manager, the pointer and the message data from the storage buffer associated with the second queue manager, in response to a message consumer requesting the message.

16. The computer system of claim 15, wherein the at least one monitor is configured to identify when a committed key is written to the coupling facility.

17. The computer system of claim 15, wherein the repository and the coupling facility are in communication with both the first queue manager and the second queue manger.

18. The computer system of claim 15, further comprising:
program instructions to remove the pointer from the committed key within the coupling facility, responsive to a request from the message consumer.

19. The computer system of claim 15, wherein the program instructions to store said message data in a storage buffer occur prior to the message consumer requesting the message data.

20. The computer system of claim 15, wherein the first queue manager and the second queue manager are configured to operate asynchronously.

* * * * *